F. W. SANFORD & N. MARSHALL.
METAL WORKING MACHINE.
APPLICATION FILED AUG. 25, 1903.
940,619.
Patented Nov. 16, 1909.
4 SHEETS—SHEET 1.
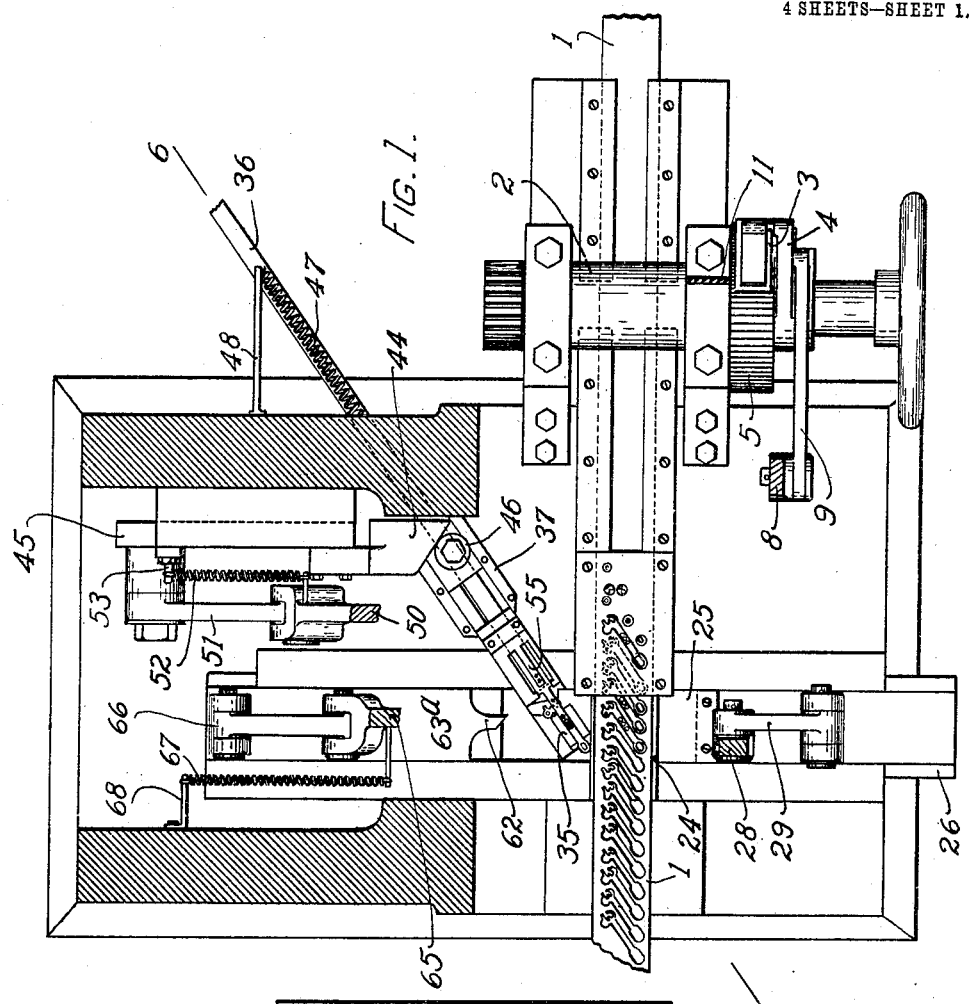
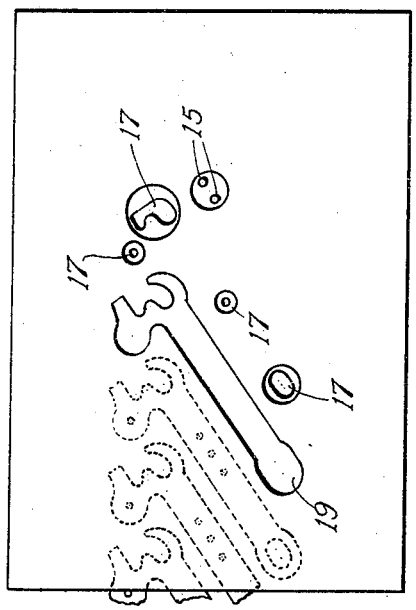
WITNESSES
A. T. Palmer
Katherine A. Dugan
INVENTORS
Norman Marshall
Frank W. Sanford
by Ira L. Fish
Atty.

F. W. SANFORD & N. MARSHALL.
METAL WORKING MACHINE.
APPLICATION FILED AUG. 25, 1903.

940,619.

Patented Nov. 16, 1909.
4 SHEETS—SHEET 2.

Witnesses
A. F. Palmer
Katharine A. Dugan

Inventors
Norman Marshall
Frank W. Sanford
by Ira L. Fish
Atty.

F. W. SANFORD & N. MARSHALL.
METAL WORKING MACHINE.
APPLICATION FILED AUG. 25, 1903.

940,619.

Patented Nov. 16, 1909.
4 SHEETS—SHEET 3.

WITNESSES
A. F. Palmer
Katherine A. Dugan

INVENTORS.
Norman Marshall
Frank W. Sanford
By Ira L. Fish
Atty.

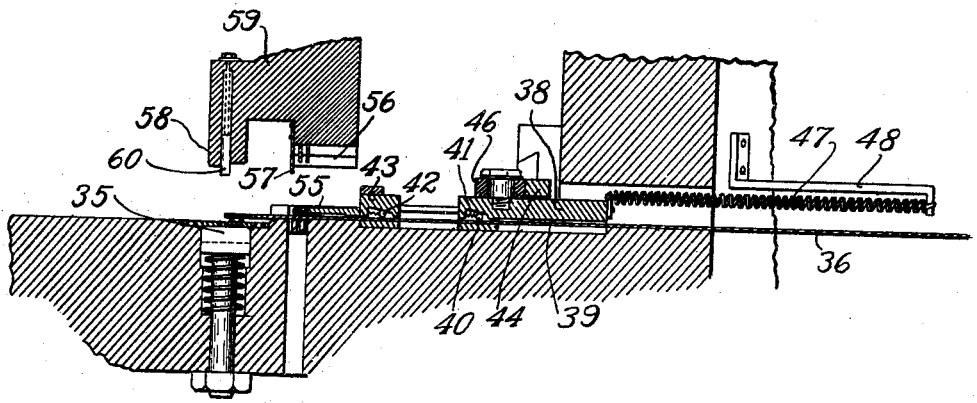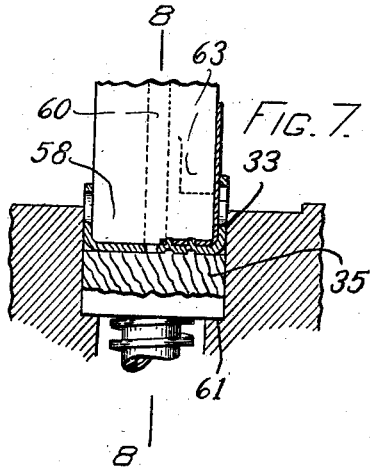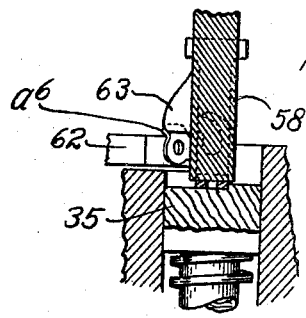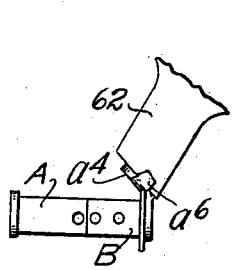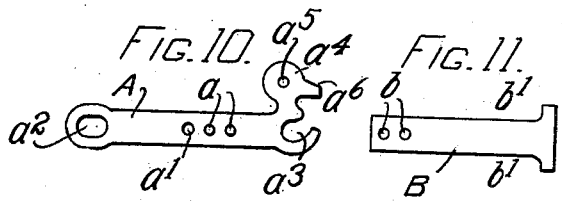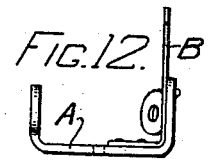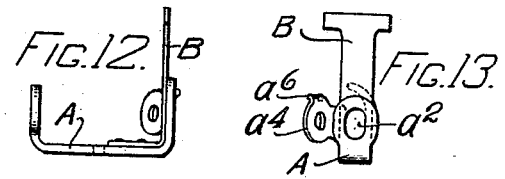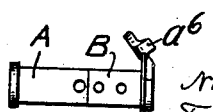

UNITED STATES PATENT OFFICE.

FRANK W. SANFORD, OF BOSTON, AND NORMAN MARSHALL, OF NEWTON, MASSACHUSETTS, ASSIGNORS, BY MESNE ASSIGNMENTS, TO NORMAN MARSHALL, OF NEWTON, MASSACHUSETTS.

METAL-WORKING MACHINE.

940,619.      Specification of Letters Patent.      Patented Nov. 16, 1909.

Application filed August 25, 1903. Serial No. 170,705.

*To all whom it may concern:*

Be it known that we, FRANK W. SANFORD, of Boston, in the county of Suffolk and State of Massachusetts, and NORMAN MARSHALL, of Newton, county of Middlesex, and State of Massachusetts, have invented certain new and useful Improvements in Metal-Working Machines, of which the following is a specification.

The invention relates to a machine for forming articles from sheet metal and more especially to a machine for forming articles made up of two blanks assembled together and bent into the desired shape.

The various features of the invention may be embodied in machines for making articles of various shape and configuration, the dies for forming the blanks and the dies for bending the blanks into the desired shape varying according to the shape and configuration of the article to be formed.

We have embodied the various features of the invention in a machine in which the forming and bending dies and the devices which coöperate therewith are properly shaped and operated to form the metallic frames used in incandescent electric light sockets for supporting the key for making and breaking the circuit and the features and combinations constituting the features of invention will be best understood from a detailed description of this machine which is illustrated in the accompanying drawings.

Figure 2:
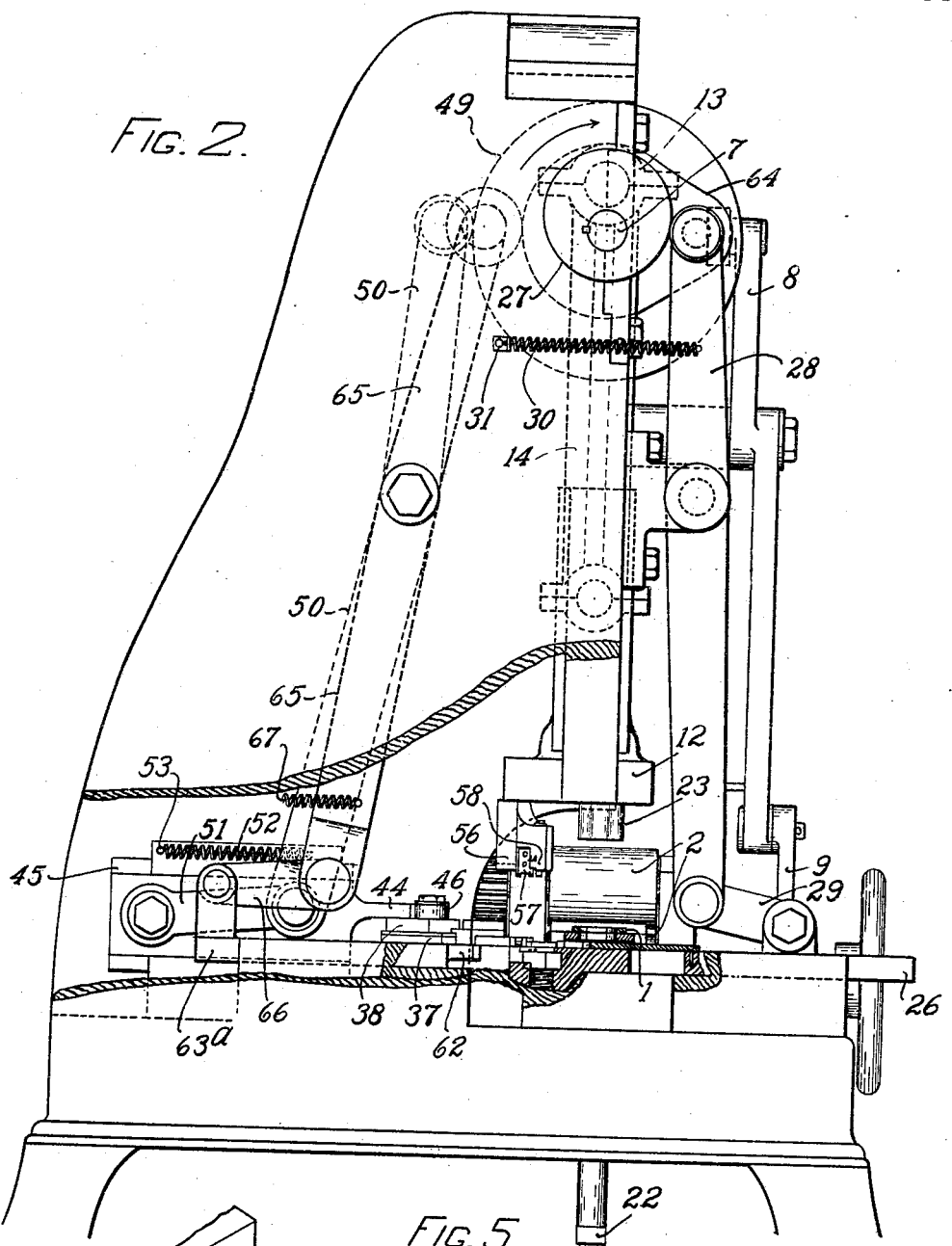
Figure 5:
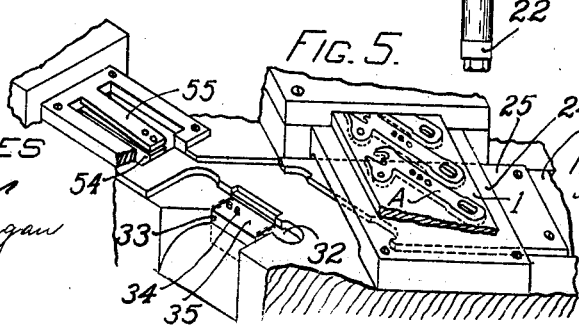
Figure 3:
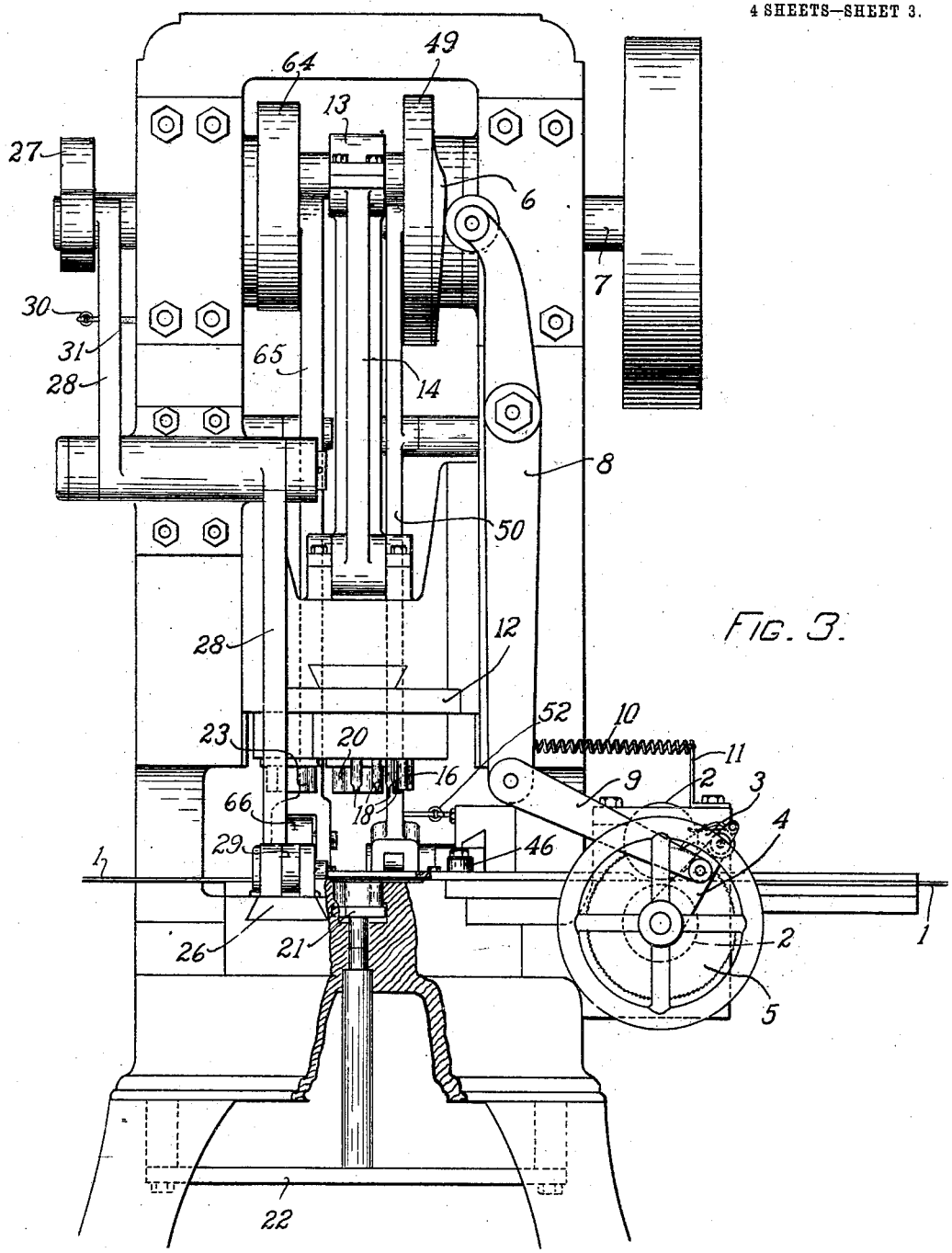

In these drawings Figure 1 shows a plan view, certain parts being broken away, Fig. 2 is a side elevation looking toward the right in Fig. 1 with a part of the supporting frame removed to better show the construction and arrangement of parts. Fig. 3 is a similar front elevation. Fig. 4, Sheet 1, is an enlarged view of the plate overlying the dies on the bed of the machine. Fig. 5, Sheet 2, is a detail perspective view. Fig. 6 is a detail sectional view on line 6—6 Fig. 1. Fig. 7 is a sectional detail showing the operation of the bending dies. Fig. 8 is a similar sectional view on line 8—8 Fig. 7. Fig. 9 is a detail showing the operation of one of the bending dies. Figs. 10 and 11 are views showing the shape of the blanks previous to assembling and bending. Figs. 12, 13 and 14 are views showing the article formed by assembling and bending the blanks.

In the machine shown in the drawings, the strip 1 from which the blanks A, Fig. 10, are punched, is intermittently fed into position to be acted upon by the dies which form the blanks, by feed rollers 2 arranged to engage the upper and under side of the strip and feed it forward through a guiding slot formed in the bed of the machine. The feed rolls are operated at the proper times by means of a pawl 3 carried on an arm 4 and arranged to engage a ratchet wheel 5 secured to the lower feed roll. The pawl carrying arm 4 is oscillated by means of a cam 6 secured to the cam shaft 7 of the machine and arranged to engage the upper end of a lever 8 the lower end of which is connected with the arm 4 by a link 9. The lever 8 is held in engagement with the cam 6 by means of a spring 10 secured to the lever and to an arm 11 fixed in the frame of the machine. By the operation of the feed rolls the strip 1 is advanced step by step between a series of fixed dies mounted in the bed plate of the machine and a series of coöperating dies carried by a reciprocating head 12 guided on suitable ways on the side frames of the machine. The head 12 is reciprocated by means of a crank 13 formed on the shaft 7 and connected with the head by means of a connecting rod 14.

The article formed by the machine is made up of a blank A of the configuration shown in Fig. 10 and a spring metal blank B of the configuration shown in Fig. 11, the two blanks being secured together by rivets $a$ struck up from the metal of the blank A and arranged to engage two holes $b$ in the blank B. The blank A is provided with a hole $a'$ for receiving the attaching screw by which the completed frame is secured to the base of the lamp socket. The blank A is provided with a hole $a^2$ which forms the bearing for one end of the key shaft in the completed frame and also with a recess $a^3$ which forms the other bearing for the key shaft. The blank A also has an ear $a^4$ in which a hole $a^5$ is formed for receiving a binding screw for connecting the wire to the frame. This ear $a^4$ is provided with a projection $a^6$ which forms a retaining lug in the completed frame. The rivets $a$ are upset in the metal of the strip 1 by the action of male dies 15, Fig. 4, secured in the bed plate of the machine and coöperating female dies 16 carried on the head 12. The holes $a'$, $a^2$ and $a^5$ and the recess $a^3$ are formed in the strip by female dies 17 secured in the bed plate and coöperating male dies 18 carried by the head 12. The blank A is punched out of the strip by the action of a female die 19 secured in the bed of the machine and a coöperating male die 20 carried by the head 12. The dies 19 and 20 and the dies 17 and 18 which form the recess $a^3$ are shaped to give the blank A the configuration shown in Fig. 10. The various dies which act upon the strip 1 in forming the blank A are so arranged that they operate upon three different blanks at each reciprocation of the head 12, the dies 15 and 16 acting upon one blank, the dies 17 and 18 upon another, and the dies 19 and 20 completing the blank upon which the preliminary operations have been performed by the dies 15, 16 and 17, 18.

The completed blank A which is punched from the strip 1 by the dies 20 and 19 is returned into the hole in the strip from which it is punched by the action of an ejector 21, Fig. 3, arranged within the female die 19 and supported upon a spring bar 22 the ends of which are secured to the frame of the machine. When the die 20 descends the spring bar 22 will yield as the blank is punched from the strip 1 and on the return of the head 12 will return to its normal position forcing the blank A back into the strip 1. As the strip 1 is fed forward the blanks which have been formed by the dies will be carried forward with the strip until they are brought into position beneath the plunger 23 carried by the head 12. When the head 12 descends the blank which is in position beneath the plunger 23 is carried downward by the plunger through an opening in a guide plate 24 into position in front of a carrier 25. The opening in the plate 24 corresponds in shape to the shape of the blank A so that the blank is accurately guided in its downward movement and the front end of the carrier 25 is shaped to fit the rear side of the blank and hold it in proper position as it is moved forward by the carrier. The carrier 25 is in the form of a plate arranged to reciprocate in a guideway formed in the bed plate of the machine and carry the blank A into position to be assembled with the blank B and also to be acted upon by the bending dies. The plate 25 is secured to the end of a slide 26 guided in suitable ways and operated by a cam 27 secured to the shaft 7 and engaging the upper end of a lever 28 the lower end of which is connected with the slide 26 by a link 29. The lever 28 is held in engagement with the cam 27 by a spring 30 secured to the lever and to an arm 31 secured to the frame. The blank A carried forward by the carrier 25 drops into the recess 32 formed in the bed plate of the machine above the female bending die 33. The blank is retained in position by the shape of the recess 32 and also by lugs 34 arranged to engage the recesses formed in the under side of the blank in upsetting the rivets $a$. The lugs 34 are formed on the upper side of a spring pressed plunger 35 mounted within the female die 33 and having a limited downward movement for a purpose to be described. While the blank is in position in the recess 32 the blank B is advanced into position to be assembled with the blank A.

The strip 36 from which the blanks B are formed is intermittently fed forward through suitable guideways into position to be acted upon by the dies which shape the blank and form the holes $b$. The feeding movement of the strip 36 also brings the partially completed blank into position to be assembled with the blank A and to be severed from the end of the strip. The strip is fed by means of the reciprocating feeding slide 38 provided with a slot 39 through which the strip passes and with a device which grips and carries forward the strip during the advance movement of the slide but does not affect the strip during its return movement. This gripping device consists of a ball 40 arranged in a wedge-shaped recess in the slide 38 and held yieldingly toward the narrow part of the recess by a spring 41. During the advance movement of the slide the ball wedges between the surface of the recess and the strip so that the strip is advanced with the slide while on the return movement of the slide the ball moves into the larger part of the recess and rolls idly along the strip. The strip is held from rearward movement during the return of the feed slide by the action of a spring pressed ball 42 arranged in a wedge-shaped recess in the guide block 43 through which the strip passes, the ball 42 being moved toward the larger part of the recess by the advance movement of the strip and wedging in between the surface of the recess and the strip when the advance movement of the strip ceases so as to prevent rearward movement thereof.

The feed slide 38 is reciprocated at the proper times by means of a cam 44 mounted on a reciprocating slide 45 and arranged to engage a roll 46 secured to the feed slide. The roll 46 is held in engagement with the cam 44 by means of a spring 47 secured to the feed slide and to a fixed arm 48. The slide 45 is reciprocated by means of a cam 49 secured to the shaft 7 and engaging the upper end of a lever 50 the lower end of which is connected with the slide 45 by a link 51. The lever 50 is held in engagement with the cam 49 by means of a spring 52 secured to the lever 50 and to a fixed stud 53.

The strip 36 as it is advanced by the feed slide passes between a series of female dies 54 and a stripping plate 55. While in position over the female dies 54 the strip is acted upon by a series of coöperating male dies 56 carried by the head 12, the dies acting to cut away the sides of the strip at $b'$ (Fig. 11) and to form the holes $b$. The movement of the strip 36 which brings it into position to be acted upon by the dies 54, 56 carries the end of the strip which has been previously acted upon by these dies into position over the blank A with the holes $b$ in register with the rivets $a$. While the blank A and the partially formed blank B are in this position indicated in Fig. 6, the blank B is severed from the end of the strip 36 by a knife 57 carried by the head 12 and the blanks A and B are assembled and bent as indicated in Fig. 7 by a male die 58 carried by the head 12 which coöperates with the female die 33. The dies 56 and 58 and the knife 57 are mounted upon a block 59 which is secured to the head 12. As the block 59 descends a spring pressed plunger 60 mounted in the die 58 engages the end of blank B and holds it against the upper surface of the blank A the rivets $a$ passing through the holes $b$ and projecting slightly above the surface of the blank B. The knife 57 then severs the blank B from the end of the strip 36 and during the continued downward movement of the block 59 the die 58 forces the blanks downward into the female die 33 thus bending the ends of the blank A and the end of blank B into vertical position as indicated in Fig. 7. The plunger 35 yields as the blanks are forced into the female die until the downward movement of the plunger is arrested by the stop shoulders 61. The rivets $a$ are then headed by the action of the male die 58, the plunger 35 acting as a rigid support for sustaining the pressure applied to the blanks in heading the rivets. During this downward movement of the block 59 the dies 54 and 56 act to shape the succeeding blank B and form the holes $b$ therein. As the dies 58 and 33 complete the bending of the blanks the ear $a^4$ on the blank A is bent into the position indicated in Fig. 9 by the action of a bending die 62 which advances and operates upon said ear while the blanks are firmly held by the dies 58 and 33. As the ear $a^4$ is bent into this position the lug $a^6$ is brought against a bending lug 63 on the die 58 (Fig. 8) and is bent downward as indicated in Figs. 9, 13 and 14. The bending die 62 is carried on a slide 63 which is advanced and retracted at the proper times by a cam 64 secured to the shaft 7 and arranged to act upon the upper end of a lever 65 the lower end of which is connected with the slide 63 by a link 66. The lever 65 is held in engagement with the cam 64 by a spring 67 secured to the lever and to a fixed arm 68.

What we claim and desire to secure by Letters Patent is;

1. The combination of dies for punching a blank from sheet metal, feeding devices for feeding a metal strip between the dies, means for returning the blank to the hole in the strip, a carrier plate beyond the dies and below the path of the strip, and devices for transferring the blank from the strip into the path of the carrier, coöperating bending dies, and means for reciprocating the carrier plate between the transferring device and the bending dies, substantially as described.

2. The combination of dies for forming a blank from sheet metal, dies for upsetting the metal of said blank to form riveting studs, dies for forming a second blank having holes to register with said riveting studs, means for feeding said blanks from the forming dies into position with the holes in register with the riveting studs, devices for heading said riveting studs, and connected mechanism for operating the dies, feeding means and heading devices, substantially as described.

3. The combination of a female bending die, a plunger within the die, means for arresting the movement of the plunger, devices for feeding a blank into position at the die, devices for feeding a second blank into register with the first blank, and a male bending die coöperating with the female die to bend both blanks, substantially as described.

4. The combination of a female bending die, a plunger within the die, means for arresting the movement of the plunger, a male die and a bending die for acting on the blank out of the plane of the female die while held between the male die and plunger, substantially as described.

5. The combination of a female bending die, a male die coöperating therewith, a bending lug on the side of the male die arranged to be engaged by the blank, and a bending die for bending the blank against the bending lug, substantially as described.

6. The combination of means for forming a blank, bending dies, means for delivering the blank to the bending dies, means for feeding a strip of metal into position over the blank between the dies, means for severing said strip to form a blank, and means for operating the bending dies to bend the blanks, substantially as described.

7. The combination of a female die, devices for feeding a blank into position over the die, means for feeding a strip of metal into position over the blank, a reciprocating head provided with a male die for coöperating with the female die and a cutter for severing a blank from the end of the strip, substantially as described.

8. The combination with means for forming a blank having one or more integral rivets thereon, means for forming a blank having holes corresponding to said rivets, bending and heading devices, and means for feeding the blanks from the forming means into position between the bending and heading devices with the holes in register with the rivets, substantially as described.

9. The combination of dies for forming a blank, means for advancing a strip of sheet metal between the dies, a carrier arranged to travel below the path of the strip, means for transferring the blank to the carrier, bending dies to which the carrier delivers the blank, means for forming a second blank and feeding it into position over the first blank, and means for operating the bending dies to simultaneously bend said blanks, substantially as described.

10. The combination of dies for forming a blank provided with one or more integral rivets, male and female bending dies, means for feeding the blank from the forming dies into position between the dies, means for forming a second blank provided with holes corresponding to the rivets, means for feeding the second blank from the forming dies into position with the holes registering with the rivets and means for operating the bending dies to bend the ends of the first blank and the second blank into parallel relation, substantially as described.

11. The combination of a female bending die, a plunger within said die having a limited movement, means for forming a blank having integral rivets thereon and feeding the same into position at the female die, means for forming a blank having holes and feeding said blank into position with the holes registering with the rivets on the first blank, and a male bending die for coöperating with the female die and plunger to simultaneously bend the blanks and head the rivets, substantially as described.

12. The combination of dies for forming the blank A provided with rivets $a$ and an ear $a^4$, male and female bending dies, means for feeding said blank into position between said dies, means for forming a blank B of sheet metal provided with holes $b$, means for feeding the blank B into position with the holes $b$ registering with the rivets $a$, means for operating the bending dies to bend the ends of the blank A and the blank B into parallel relation, and a bending die for engaging and bending the ear $a^4$, substantially as described.

13. The combination of a series of dies for forming a blank, means for intermittently advancing a strip of sheet metal between the dies, means for returning the blank to the hole in the strip, a carrier arranged to travel below the path of the strip transversely to the travel of the strip, means for transferring the blank to the carrier, bending dies to which the carrier delivers the blank, means for feeding a strip of sheet metal into position over said blank between the bending dies, means for shaping said strip and severing the same to form a blank, and means for operating the bending dies to simultaneously bend said blanks, substantially as described.

14. The combination of a female die 33 having parallel end walls, a male die 58 having corresponding end walls, and a bending die 62 arranged to act on one side of the blank above the die 33, and form a lateral bend in a part of the projecting blank, substantially as described.

15. The combination of a female die 33 having parallel end walls, a male die 58 having corresponding end walls and provided with a bending lug 63 arranged to lie above the female die when the male die is in its advanced position, and a bending die 62 arranged to engage the blank out of the plane of the lug 63, substantially as described.

16. The combination with bending and heading devices of means for feeding a blank having one or more rivets thereon into register with the bending and heading devices, means for feeding a blank having holes corresponding with the rivets into position with the holes and in register with the rivets, and mechanism for operating the bending and heading devices, substantially as described.

17. The combination with male and female bending dies of means for feeding a blank provided with one or more rivets into register with the dies, means for feeding a second blank into position with holes therein in register with the rivets, and means for operating the bending dies to head the rivets and bend the ends of the blanks into parallel relation, substantially as described.

In testimony whereof we have affixed our signatures, in presence of two witnesses.

FRANK W. SANFORD.
NORMAN MARSHALL.

Witnesses:
   GEO. N. GODDARD,
   IRA L. FISH.